US011408333B2

(12) United States Patent
Cola

(10) Patent No.: US 11,408,333 B2
(45) Date of Patent: Aug. 9, 2022

(54) VALVE ASSEMBLY FOR A DUAL VOLUTE TURBOCHARGER AND DUAL VOLUTE TURBOCHARGER INCLUDING THE SAME

(71) Applicant: BorgWarner Inc., Auburn Hills, MI (US)

(72) Inventor: Michael Daniel Cola, Fletcher, NC (US)

(73) Assignee: BorgWarner Inc., Auburn Hills, MI (US)

( * ) Notice: Subject to any disclaimer, the term of this patent is extended or adjusted under 35 U.S.C. 154(b) by 205 days.

(21) Appl. No.: 16/788,927

(22) Filed: Feb. 12, 2020

(65) Prior Publication Data

US 2020/0263599 A1 Aug. 20, 2020

Related U.S. Application Data

(60) Provisional application No. 62/962,321, filed on Jan. 17, 2020, provisional application No. 62/806,434, filed on Feb. 15, 2019.

(51) Int. Cl.
*F02B 37/22* (2006.01)
*F02D 23/00* (2006.01)
(Continued)

(52) U.S. Cl.
CPC .............. *F02B 37/22* (2013.01); *F01D 9/026* (2013.01); *F02B 37/025* (2013.01);
(Continued)

(58) Field of Classification Search
CPC ...... F02B 37/025; F02B 37/18; F02B 37/183; F02B 37/186; F02B 37/22; F01D 9/026;
(Continued)

(56) References Cited

U.S. PATENT DOCUMENTS 3,423,926 A 1/1969 Nancarrow et al.
6,250,079 B1 6/2001 Zander et al.
(Continued)

FOREIGN PATENT DOCUMENTS

DE 19826355 A1 12/1999
DE 102006046826 A1 4/2008
(Continued)

OTHER PUBLICATIONS

Machine-assisted English language abstract for DE 10 2016 100 329 A1 extracted from espacenet.com database on May 6, 2021, 2 pages.
(Continued)

*Primary Examiner* — Loren C Edwards
(74) *Attorney, Agent, or Firm* — Howard & Howard Attorneys PLLC

(57) ABSTRACT

A valve assembly for controlling exhaust gas flow to a turbine housing interior of a dual volute turbocharger includes a first valve member, a valve shaft, and a second valve member. The first valve member is disposed about and extends along an axis between a first end and a second end and is movable between a first, a second, and a third position for controlling exhaust gas flow to the turbine housing interior. The first valve member defines a valve interior between the first and second ends. The valve shaft is partially disposed in the valve interior and is coupled to the first end of the first valve member. The second valve member has a base coupled to and disposed about the valve shaft and a projection extending from the base and about the shaft into the valve interior. The second valve member is movable between closed and open positions.

18 Claims, 9 Drawing Sheets

(51) Int. Cl.
*F04D 15/00* (2006.01)
*F02B 37/02* (2006.01)
*F02B 37/18* (2006.01)
*F01D 9/02* (2006.01)
*F16K 11/04* (2006.01)
*F16K 11/16* (2006.01)

(52) U.S. Cl.
CPC .......... *F02B 37/183* (2013.01); *F02B 37/186* (2013.01); *F02D 23/00* (2013.01); *F04D 15/0022* (2013.01); *F16K 11/04* (2013.01); *F16K 11/161* (2013.01)

(58) Field of Classification Search
CPC ...... F01D 17/105; F01D 17/145; F16K 11/02; F16K 11/04; F16K 11/10; F16K 11/14; F16K 11/16; F16K 11/161
See application file for complete search history.

(56) References Cited

U.S. PATENT DOCUMENTS

| | | | |
|---|---|---|---|
| 6,672,061 | B2 | 1/2004 | Schmid et al. |
| 6,969,048 | B2 | 11/2005 | Colic et al. |
| 7,934,379 | B2 | 5/2011 | Kuspert et al. |
| 8,499,557 | B2 | 8/2013 | Grabowska |
| 9,359,939 | B2 | 6/2016 | Kindl et al. |
| 9,556,786 | B2 | 1/2017 | Marques et al. |
| 9,810,143 | B2 | 11/2017 | McConville et al. |
| 10,006,342 | B2 | 6/2018 | Smiljanovski et al. |
| 10,030,518 | B2 | 7/2018 | Lummer et al. |
| 10,119,549 | B2 | 11/2018 | Tschirschke |
| 2004/0244373 | A1 | 12/2004 | Frankenstein et al. |
| 2007/0119170 | A1 | 5/2007 | Masson et al. |
| 2012/0060494 | A1 | 3/2012 | Sato et al. |
| 2015/0292394 | A1 | 10/2015 | Uibelhoer et al. |
| 2017/0234435 | A1 | 8/2017 | Hermann et al. |
| 2017/0241329 | A1 | 8/2017 | Uehane et al. |
| 2018/0328217 | A1 | 11/2018 | Walkingshaw et al. |
| 2018/0328268 | A1 | 11/2018 | Babak |
| 2019/0301355 | A1 | 10/2019 | Walkingshaw et al. |
| 2020/0141309 | A1* | 5/2020 | Reif .............. F16K 11/085 |

FOREIGN PATENT DOCUMENTS

| | | | | |
|---|---|---|---|---|
| DE | 102010008411 | A1 | 8/2011 | |
| DE | 102013002894 | A1 | 9/2014 | |
| DE | 112013002306 | T5 | 2/2015 | |
| DE | 102015011256 | A1 | 3/2016 | |
| DE | 102016100329 | A1 | 7/2016 | |
| DE | 102015209044 | A1 | 11/2016 | |
| DE | 102016006719 | A1 * | 2/2017 | ............. F02B 37/18 |
| DE | 102015122351 | A1 | 6/2017 | |
| DE | 102016103145 | A1 | 8/2017 | |
| DE | 202018101705 | U1 | 4/2018 | |
| DE | 202018104140 | U1 | 7/2018 | |
| EP | 1939427 | B1 | 2/2012 | |
| EP | 2444626 | A1 | 4/2012 | |
| EP | 2708717 | B1 | 9/2015 | |
| EP | 2803838 | B1 | 9/2016 | |
| JP | 2009024584 | A | 2/2009 | |
| WO | 2007060831 | A1 | 5/2007 | |
| WO | 2011101005 | A1 | 8/2011 | |
| WO | 2016094268 | A1 | 6/2016 | |
| WO | 2017102040 | A1 | 6/2017 | |

OTHER PUBLICATIONS

Borgwarner, "News Relsease: BorgWarner Introduces Dual Volute Turbocharger for Gasoline Engines", https://cdn.borgwarner.com/docs/default-sourrce/press-release-downloads/borgwarner-introduces-dual-volute-turbocharger-for-gasoline-enginesfba3d8c4e9169aab321ff0400c8ba1a.pdf?sfvrsn=4232b63c_2, Sep. 6, 2018, 9 pages.

Borgwarner, "Performance Turbocharger Catalog", http://www.turbotekniikka.fi/PerformanceTurbochargerCatalog.pdf, Jan. 1, 2011, 12 pages.

U.S. Appl. No. 16/788,891, filed Feb. 12, 2020, 35 pages.
U.S. Appl. No. 16/788,087, filed Feb. 13, 2020, 34 pages.
U.S. Appl. No. 62/806,434, filed Feb. 15, 2019, 41 pages.
U.S. Appl. No. 62/806,396, filed Feb. 15, 2019, 43 pages.

English language abstract and machine-assisted English translation for DE 10 2006 046 826 extracted from espacenet.com database on Feb. 26, 2020, 7 pages.

English language abstract and machine-assisted English translation for DE 10 2010 008 411 extracted from espacenet.com database on Feb. 26, 2020, 9 pages.

English language abstract and machine-assisted English translation for DE 10 2013 002 894 extracted from espacenet.com database on Feb. 26, 2020, 8 pages.

English language abstract for DE 11 2013 002 306 extracted from espacenet.com database on Feb. 26, 2020, 1 page.

English language abstract and machine-assisted English translation for DE 10 2015 011 256 extracted from espacenet.com database on Feb. 26, 2020, 13 pages.

English language abstract for DE 10 2015 122 351 extracted from espacenet.com database on Feb. 26, 2020, 2 pages.

English language abstract and machine-assisted English translation for DE 10 2016 103 145 extracted from espacenet.com database on Feb. 26, 2020, 14 pages.

English language abstract and machine-assisted English translation for DE 10 2015 209 044 extracted from espacenet.com database on Feb. 26, 2020, 11 pages.

English language abstract for DE 20 2018 101 705 extracted from espacenet.com database on Feb. 26, 2020, 2 pages.

English language abstract and machine-assisted English translation for EP 1 939 427 extracted from espacenet.com database on Feb. 26, 2020, 13 pages.

English language abstract and machine-assisted English translation for EP 2 803 838 extracted from espacenet.com database on Feb. 26, 2020, 11 pages.

English language abstract and machine-assisted English translation for WO 2011/101005 extracted from espacenet.com database on Feb. 26, 2020, 6 pages.

English language abstract and machine-assisted English translation for WO 2017/102040 extracted from espacenet.com database on Feb. 26, 2020, 6 pages.

English language abstract and machine-assisted English translation for DE 198 26 355 extracted from espacenet.com database on May 27, 2020, 8 pages.

Machine-assisted English language abstract for DE 20 2018 104 140 extracted from espacenet.com database on Jun. 24, 2020, 3 pages.

English language abstract and machine-assisted English translation for JP 2009-024584 extracted from espacenet.com database on May 20, 2020, 15 pages.

* cited by examiner

VALVE ASSEMBLY FOR A DUAL VOLUTE TURBOCHARGER AND DUAL VOLUTE TURBOCHARGER INCLUDING THE SAME

CROSS-REFERENCE TO RELATED APPLICATIONS

The subject patent application claims priority to and all the benefits of U.S. Provisional Patent Application No. 62/806,434 filed on Feb. 15, 2019 and U.S. Provisional Patent Application No. 62/962,321 filed on Jan. 17, 2020, the disclosures of which are herein incorporated by reference in their entirety.

BACKGROUND OF THE INVENTION

1. Field of the Invention

The present invention generally relates to a valve assembly for controlling exhaust gas flow to a turbine housing interior of a dual volute turbocharger, and to a dual volute turbocharger including the valve assembly.

2. Description of the Related Art

Dual volute turbochargers receive exhaust gas from an internal combustion engine and deliver compressed air to the internal combustion engine. Dual volute turbochargers are used to increase power output of the internal combustion engine, lower fuel consumption of the internal combustion engine, and reduce emissions produced by the internal combustion engine. Delivery of compressed air to the internal combustion engine by the dual volute turbocharger allows the internal combustion engine to be smaller, yet able to develop the same or similar amount of horsepower as larger, naturally aspirated internal combustion engines. Having a smaller internal combustion engine for use in a vehicle reduces the mass and aerodynamic frontal area of the vehicle, which helps reduce fuel consumption of the internal combustion engine and improve fuel economy of the vehicle.

Dual volute turbochargers include a turbine housing. The turbine housing has an interior surface defining a turbine housing interior, a first volute, a second volute, and a turbine housing outlet. The first and second volutes are each adapted for fluid communication with the internal combustion engine and the turbine housing interior for delivering exhaust gas from the internal combustion engine to the turbine housing interior. The turbine housing also includes a wall separating the first and second volutes and a valve seat. The wall and the valve seat collectively define a valve cavity.

Dual volute turbochargers also include a valve assembly for controlling exhaust gas flow to the turbine housing interior. Conventional valve assemblies include a first valve member, a shaft, and a second valve member. The first valve member is coupled to the shaft and enlargeable with the wall of the turbine housing. The first valve member is movable between a first position where the first valve member is disposed in the valve cavity and engaged with the wall, a second position where first valve member is disposed in the valve cavity and disengaged with the wall, and a third position where the first valve member is disposed outside of the valve cavity. The second valve member is coupled to the shaft and engageable with the valve seat of the turbine housing. The second valve member is movable between a closed where the second valve member is engaged with the valve seat and an open position where the second valve member is disengaged with the valve seat. Conventional wastegate assemblies also include a biasing member configured to bias the first and/or second valve member in at least one of the aforementioned positions.

During operation of the dual volute turbocharger, exhaust gas flows through the first and second volutes and exerts a force on the first valve member, particularly when the first valve member is in the first and second positions. Over time, force exerted by exhaust gas on the first valve member causes wear of various components of the valve assembly, thereby decreasing efficiency of the dual volute turbocharger and ultimately leading to failure of the valve assembly. In addition, the biasing member is exposed to exhaust gas during operation of the turbocharger which causes wear of the biasing member. This wear of the biasing member also decreases efficiency of the dual volute turbocharger and ultimately leads to failure of the valve assembly.

As such, there remains a need to provide an improved valve assembly for a dual volute turbocharger.

SUMMARY OF THE INVENTION AND ADVANTAGES

A dual volute turbocharger delivers compressed air to an internal combustion engine and receives exhaust gas from the internal combustion engine. The dual volute turbocharger includes a turbine housing. The turbine housing includes an interior surface defining a turbine housing interior, a first volute, a second volute, and a turbine housing outlet. The turbine housing interior is adapted to receive a turbine wheel. The first and second volutes are each adapted for fluid communication with the internal combustion engine and the turbine housing interior for delivering exhaust gas from the internal combustion engine to the turbine housing interior. The turbine housing outlet is in fluid communication with the turbine housing interior for discharging exhaust gas from the turbine housing interior. The turbine housing also includes a wall separating the first volute from the second volute. The turbine housing further includes a valve seat. The wall and the valve seat collectively define a valve cavity.

The dual volute turbocharger also includes a valve assembly that controls exhaust gas flow from the first and second volutes to the turbine housing interior. The valve assembly includes a first valve member that is engageable with the wall of the turbine housing. The first valve member extends along an axis between a first end adapted to be proximal the wall of the turbine housing and a second end adapted to be distal the wall of the turbine housing. The first valve member defines a valve interior between the first and second ends. The first valve member is movable between a first position where the first valve member is disposed in the valve cavity and adjacent the wall of the turbine housing for restricting exhaust gas from flowing between the first and second volutes, a second position where the first valve member is disposed in the valve cavity and spaced from the wall of the turbine housing for allowing exhaust gas to flow between the first and second volutes, and a third position where the first valve member is disposed outside of the valve cavity for allowing exhaust gas from the first and second volutes to bypass the turbine housing interior. The valve assembly also includes a shaft partially disposed in the valve interior and coupled to and extending from the first end of the first valve member for moving the first valve member between the first, second, and third positions. The valve assembly further includes a second valve member engageable with the valve seat. The second valve member has a base coupled to and disposed about the shaft and a projection extending from the base and about the shaft into the valve interior. The second valve member is movable between a closed position where the base is engaged with the valve seat of the turbine housing for restricting exhaust gas from the first and second volutes from bypassing the turbine housing interior, and an open position where the base is disengaged with the valve seat of the turbine housing for allowing exhaust gas from the first and second volutes to bypass the turbine housing interior. Although not required, the first valve member may have an outer contour configured to reduce wear of the valve assembly. In addition, the valve assembly may further include a biasing member disposed in the valve interior and about the shaft. When present, the biasing member is configured to bias the first valve member into one of the first and second positions when the second valve member is in the closed position.

Accordingly, when the outer contour of the first valve member is configured to reduce wear of the valve assembly, the outer contour of the first valve member reduces force exerted by exhaust gas on the first valve member, thereby reducing wear of the first valve member, the valve shaft, and the second valve member. This reduced wear results in increased efficiency of the dual volute turbocharger and increased lifetime of the dual volute turbocharger. Moreover, when the biasing member is included in the valve interior of the first valve member, exposure of the biasing member to exhaust gas during operation of the dual volute turbocharger is reduced as compared to other components of the valve assembly because the biasing member is disposed in the valve interior of the first valve member. As such, wear of the biasing member is reduced, thereby increasing efficiency of the dual volute turbocharger and increasing lifetime of the dual volute turbocharger.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
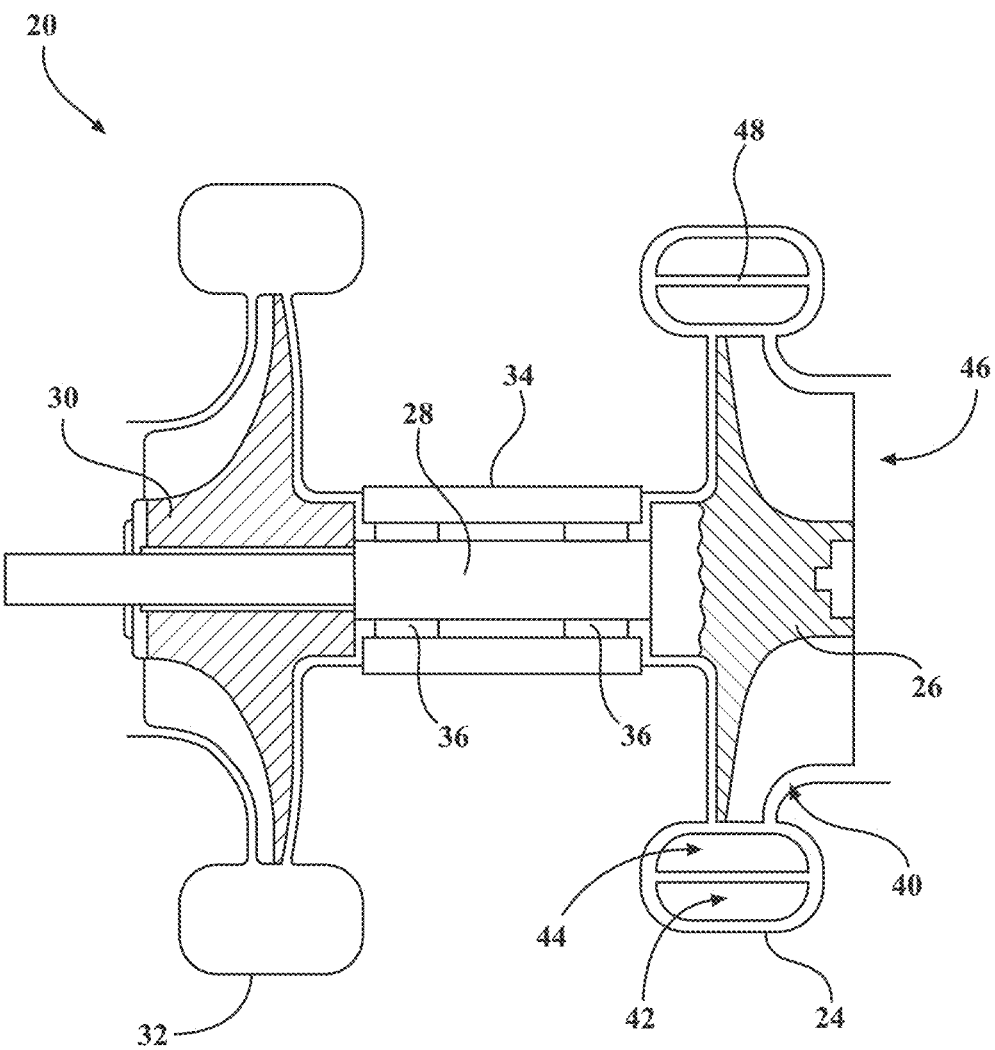
FIG. 1 is a schematic representation of a dual volute turbocharger.

With reference to the Figures, wherein like numerals indicate like parts throughout the several views, a schematic representation of a dual volute turbocharger 20 for receiving exhaust gas from an internal combustion engine 22 (shown in FIG. 2) and delivering compressed air to the internal combustion engine 22 is shown in FIG. 1. Although not required, the dual volute turbocharger 20 is typically used in passenger and commercial automotive applications. However, it is to be appreciated that the dual volute turbocharger 20 may be used in non-automotive applications such as heavy equipment applications, non-automotive diesel engine applications, non-automotive motor applications, and the like. As shown in FIGS. 1-3B, the dual volute turbocharger 20 includes a turbine housing 24 and a turbine wheel 26 disposed in the turbine housing 24.

With reference again to FIG. 1, the dual volute turbocharger 20 typically includes a turbocharger shaft 28, a compressor wheel 30, a compressor housing 32, and a bearing housing 34. During operation of the dual volute turbocharger 20, the turbine wheel 26 receives exhaust gas from the internal combustion engine 22 which causes the turbine wheel 26 to rotate. The turbocharger shaft 28 is coupled to and rotatable by the turbine wheel 26. The compressor wheel 30 is coupled to the turbocharger shaft 28 and is rotatable by the turbocharger shaft 28 for delivering compressed air to the internal combustion engine 22. The compressor wheel 30 is disposed in the compressor housing 32. The bearing housing 34 extends about the turbocharger shaft 28 between the turbine wheel 26 and the compressor wheel 30. The dual volute turbocharger 20 also typically includes bearings 36 disposed about the turbocharger shaft 28 and in the bearing housing 34 for rotatably supporting the turbocharger shaft 28.

Figure 2:
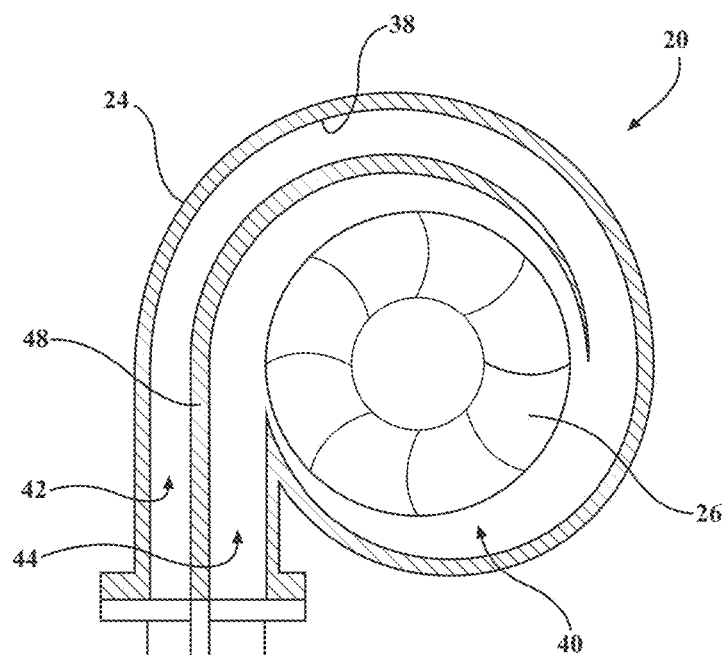
FIG. 2 is a schematic representation of a turbine housing of the dual volute turbocharger adapted for fluid communication with an internal combustion engine.
Figure 2:
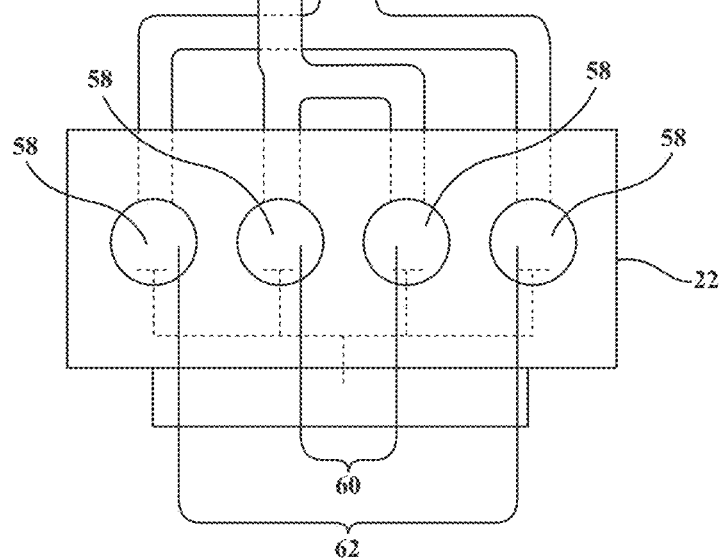
Figure 3A:
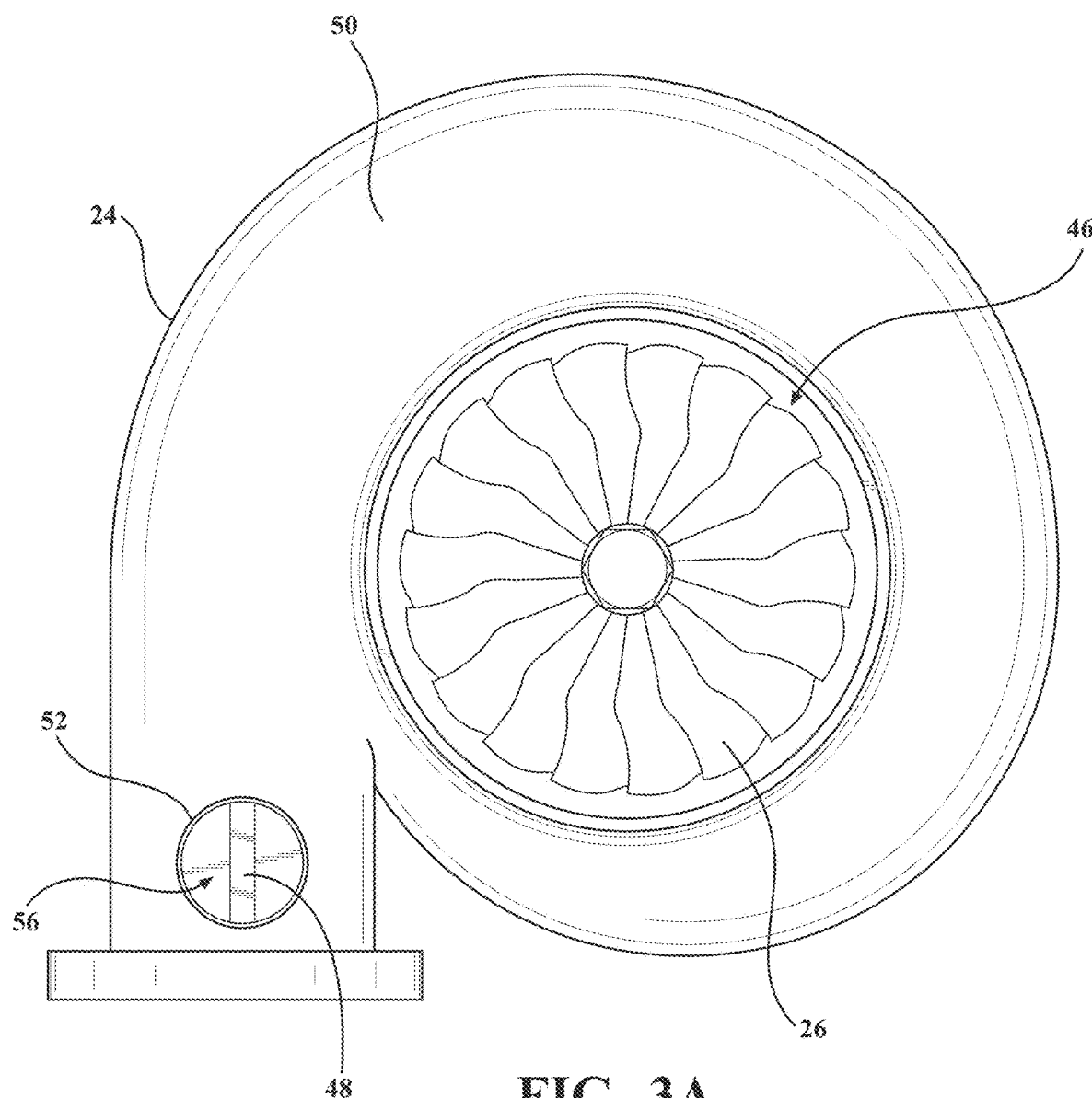
FIG. 3A is a top view of the turbine housing according to one embodiment, with the turbine housing including a wall and an exterior surface having a valve seat, and with the wall and the valve seat collectively defining a valve cavity.
Figure 3B:
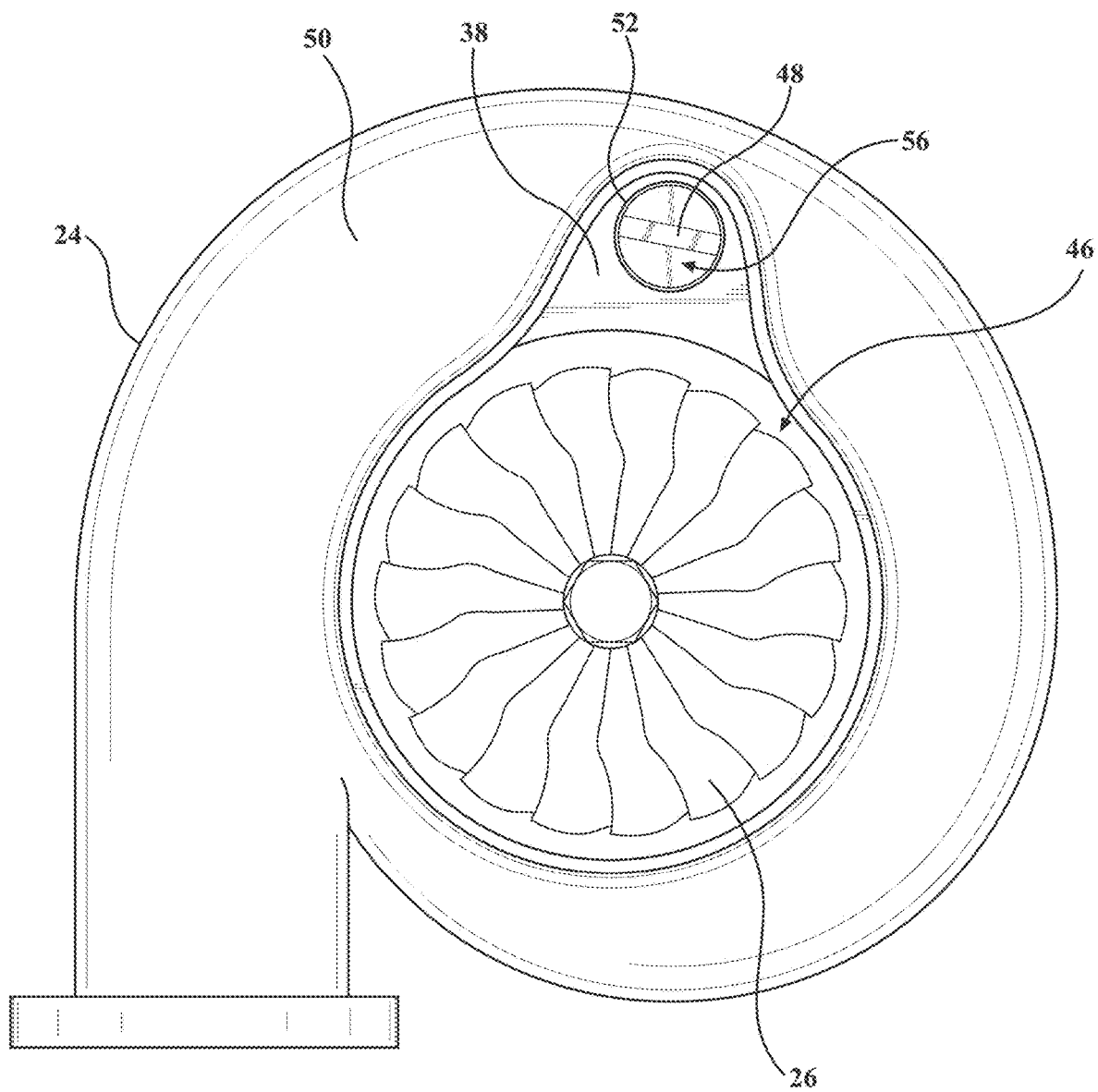
FIG. 3B is a top view of the turbine housing according to another embodiment, with the turbine housing including the wall and an interior surface having the valve seat, and with the wall and the valve seat collectively defining the valve cavity.

As shown in FIG. 2, the turbine housing 24 includes an interior surface 38 that defines a turbine housing interior 40. The turbine housing interior 40 is adapted to receive the turbine wheel 26. The interior surface 38 also defines a first volute 42, and a second volute 44. The first and second volutes 42, 44 are each in fluid communication with the internal combustion engine 22 and the turbine housing interior 40 for delivering exhaust gas from the internal combustion engine 22 to the turbine housing interior 40. As shown in FIGS. 1, 3A and 3B, the interior surface 38 also defines a turbine housing outlet 46. The turbine housing outlet 46 is in fluid communication with the turbine housing interior 40 for discharging exhaust gas from the turbine housing interior 40. With reference again to FIG. 2, the turbine housing 24 also includes a wall 48 separating the first volute 42 from the second volute 44. The turbine housing 24 may be comprised of any suitable metal or plastic. Typically, the turbine housing 24 is comprised of metal.

As shown in FIGS. 3A and 3B, the turbine housing 24 further includes a valve seat 52. Typically, the valve seat 52 has as circular configuration, as shown in FIGS. 3A and 3B. However, it is to be appreciated that the valve seat 52 may have any configuration suitable for receiving a valve assembly 54 that will be described in greater detail below. The wall 48 and the valve seat 52 collectively define a valve cavity 56. The valve seat 52 may be included on an exterior surface 50 of the turbine housing 24, as shown in FIG. 3A. Alternatively, the valve seat 52 may be included on the interior surface 38 of the turbine housing 24, as shown in FIG. 3B.

With reference again to FIG. 2, the internal combustion engine 22 includes a plurality of cylinders 58. In the illustrated embodiment, the internal combustion engine includes four cylinders 58. However, it is to be appreciated that the internal combustion engine 22 may include any number of cylinders 58. For example, the internal combustion engine 22 may include two cylinders 58, four cylinders 58, six cylinders 58, eight cylinders 58, or more cylinders 58. The internal combustion engine 22 may have a V-engine configuration, a flat/boxer engine configuration, a W-engine configuration, an inline engine configuration, and the like. In the illustrated embodiment, the internal combustion engine 22 has an inline engine configuration. The internal combustion engine 22 includes a first group of cylinders 60 and a second group of cylinders 62. The first and second groups of cylinders 60, 62 each include half of the cylinders 58 that are included in the internal combustion engine 22. For example, when the internal combustion engine 22 includes four cylinders 58 as shown in FIG. 2, the first group of cylinders 60 includes two of the cylinders 58 and the second group of cylinders 62 includes the other two of the cylinders 58. The first and second groups of cylinders 60, 62 produce exhaust gas in a series of pulses corresponding to an exhaust stroke of each of the first and second groups of cylinders 60, 62. Timing of the exhaust stroke of the first group of cylinders 60 is different from timing of the exhaust stroke of the second group of cylinders 62 such that the first and second groups of cylinders 60, 62 alternate pulses of exhaust gas.

With continued reference to FIG. 2, typically the first group of cylinders 60 are in fluid communication with the first volute 42 and the second group of cylinders 62 are in communication with the second volute 44. In this manner, pulses of exhaust gas from the first and second groups of cylinders 60, 62 flow through the first and second volutes 42, 44, respectively, to the turbine housing interior 40, where the pulses of exhaust gas rotate the turbine wheel 26.

With reference to FIGS. 4-7, the dual volute turbocharger 20 also includes a valve assembly 54 for controlling exhaust gas flow from the first and second volutes 42, 44 to the turbine housing interior 40.

Figure 4:
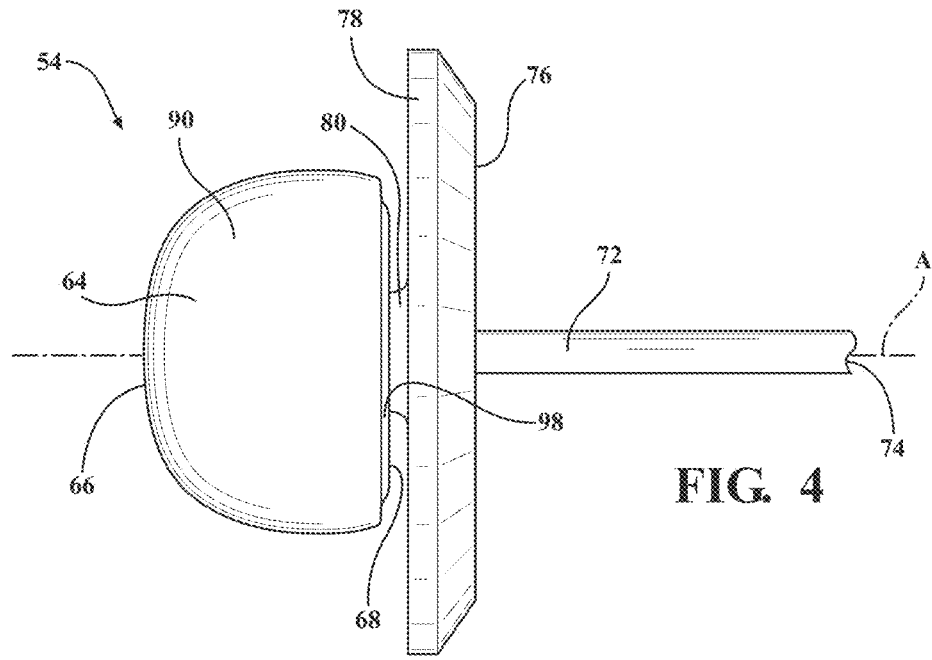
FIG. 4 is a side view of a valve assembly according to one embodiment, with the valve assembly including a first valve member that is engageable with the wall of the turbine housing and a second valve member that is engageable with the valve seat of the exterior surface of the turbine housing.
Figure 6:
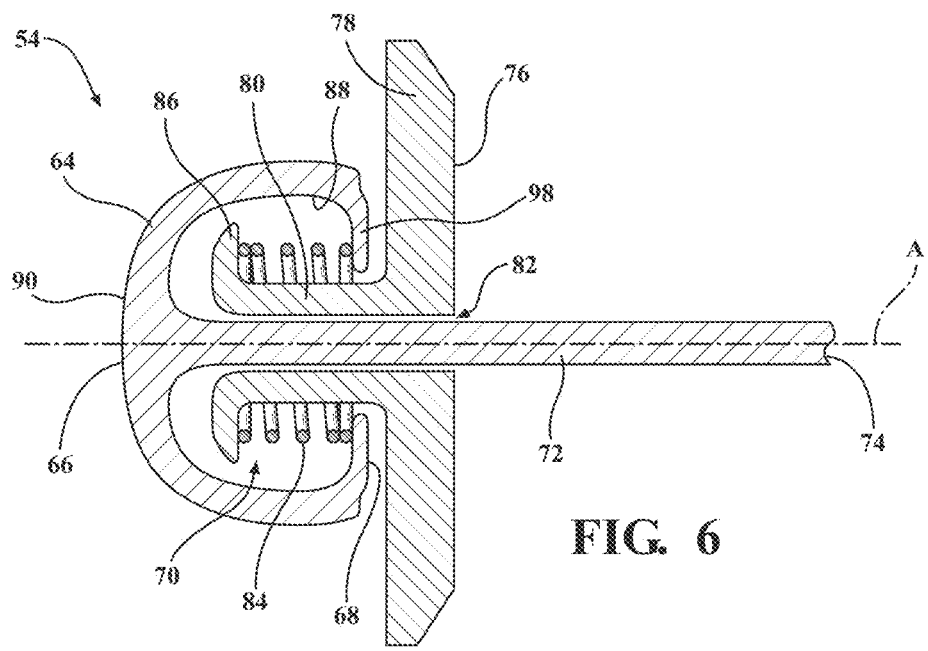
FIG. 6 is a cross-sectional view of the valve assembly of FIG. 4, showing the first valve member extending along the axis between a first end and a second end spaced from the first end, with the first valve member defining a valve interior between the first and second ends, and with a biasing member disposed in the valve interior.
Figure 8:
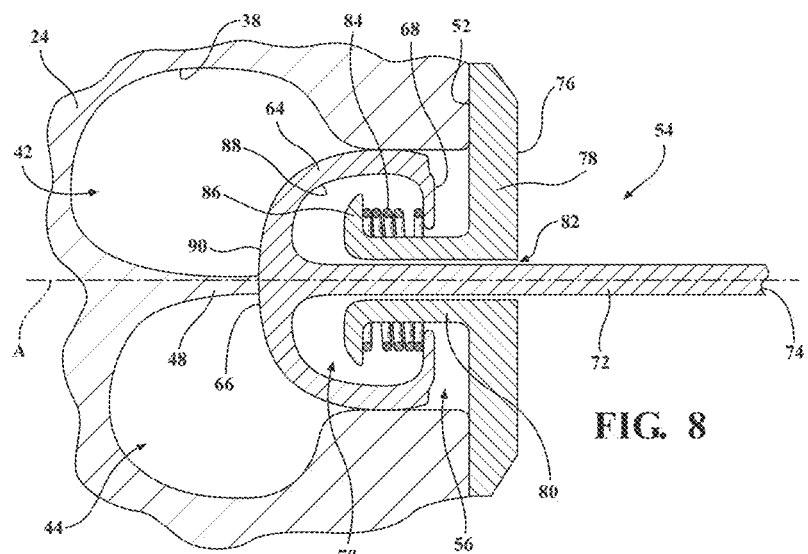
FIG. 8 is a cross-sectional view of the valve assembly of FIG. 4 and the turbine housing of FIG. 3A, with the first valve member in a first position where the first valve member is disposed in the valve cavity and adjacent the wall of the turbine housing, and with the second valve member in a closed position where a base of the second valve member is engaged with the valve seat of the turbine housing.
Figure 9:
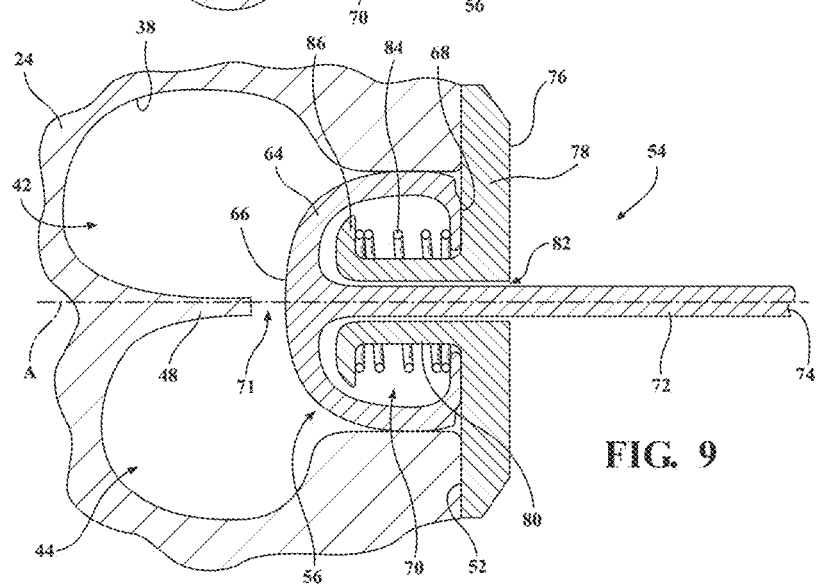
FIG. 9 is a cross-sectional view of the valve assembly of FIG. 4 and the turbine housing of FIG. 3A, with the first valve member in a second position where the first valve member is disposed in the valve cavity and spaced from the wall of the turbine housing, and with the second valve member in the closed position.
Figure 10:
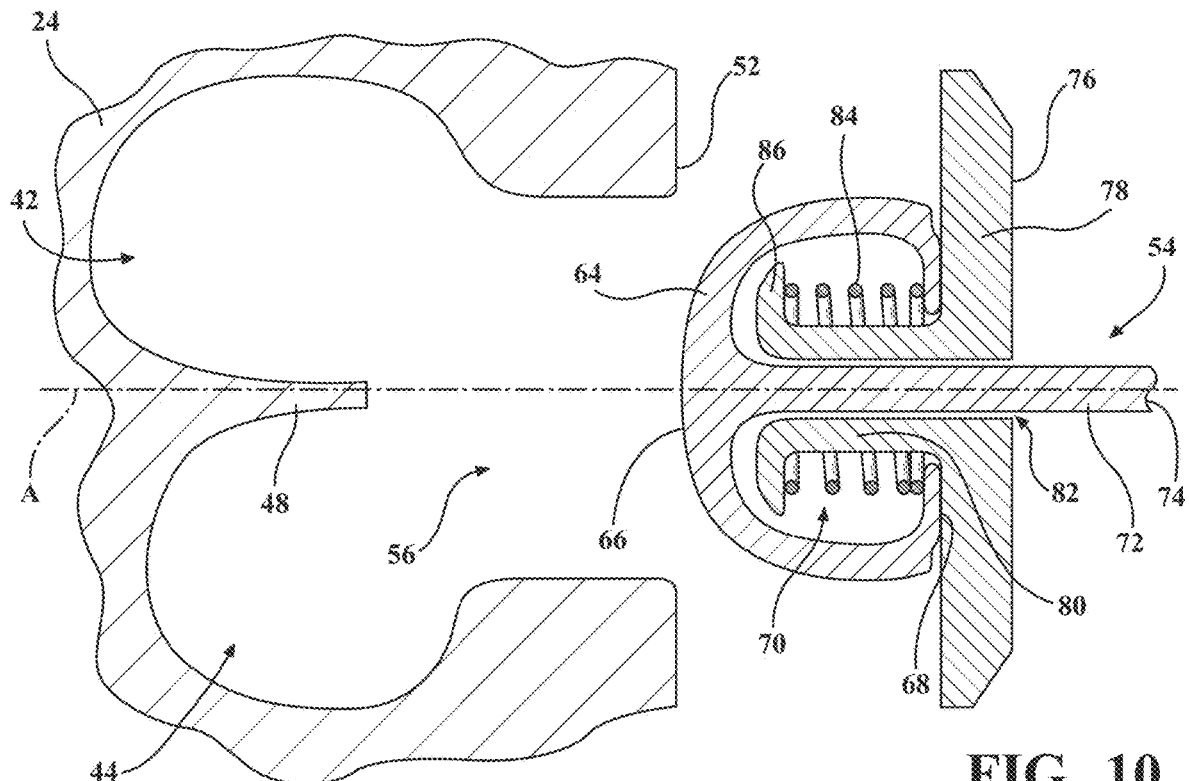
FIG. 10 is a cross-sectional view of the valve assembly of FIG. 4 and the turbine housing of FIG. 3A, with the first valve member in a third position where the first valve member is disposed outside of the valve cavity, and with the second valve member in an open position where the base of the second valve member is disengaged with the valve seat.

As shown in FIG. 4, the valve assembly 54 includes a first valve member 64. The first valve member 64 is engageable with the wall 48 of the turbine housing 24. With reference to FIG. 6, the first valve member 64 is disposed about an axis A between a first end 66 adapted to be proximal to the wall 48 of the turbine housing 24 and a second end 68 spaced from the first end 66 and adapted to be distal to the wall 48 of the turbine housing 24. The first valve member 64 defines a valve interior 70 between the first and second ends 66, 68. The first valve member 64 may be comprised of any suitable metal. With reference to FIGS. 8-10, the first valve member 64 is movable between a first position, a second position, and a third position.

As shown in FIG. 8, when the first valve member 64 is in the first position, the first valve member 64 is disposed in the valve cavity 56 and adjacent the wall 48 of the turbine housing 24 for restricting exhaust gas from flowing between the first and second volutes 42, 44. Although not required, in some embodiments, the first valve member is engaged with the wall 48, as shown in FIG. 8. Specifically, the first end 66 of the first valve member 64 is engaged with the wall 48 of the turbine housing 24. However, it is to be appreciated that the first valve member 64 may not be engaged with the wall 48 in the first position, and instead the first valve member 64 may be in close proximity to the wall 48. Accordingly, when the first valve member 64 is in the first position, pulses of exhaust gas from the first group of cylinders 60 flow through the first volute 42 to the turbine housing interior 40 and are restricted from flowing to the second volute 44 because the first valve member 64 is adjacent the wall 48 of the turbine housing 24. Similarly, pulses of exhaust gas from the second group of cylinders 62 flow through the second volute 44 to the turbine housing interior 40 and are restricted flowing to first volute 42 because the first valve member 64 is adjacent the wall 48 of the turbine housing 24.

As shown in FIG. 9, when the first valve member 64 is in the second position, the first valve member 64 is disposed in the valve cavity 56 and spaced from the wall 48 of the turbine housing 24 for allowing exhaust gas to flow between the first and second volutes 42, 44. Specifically, exhaust gas can flow between the first and second volutes 42, 44 through a gap 71 between the first valve member 64 and the wall 48 because the first valve member 64 is spaced from the wall 48. Accordingly, when the first valve member 64 is in the second position, as shown in FIG. 9, pulses of exhaust gas from the first group of cylinders 60 flow through the first volute 42 to the turbine housing interior 40 and also through the first volute 42 to the second volute 44 and then to the turbine housing interior 40. Similarly, pulses of exhaust gas from the second group of cylinders 62 flow through the first volute 42 to the turbine housing interior 40 and also through the first volute 42 to the second volute 44 and then to the turbine housing interior 40.

As shown in FIG. 10, when the first valve member is in the third position, the first valve member 64 is disposed outside of the valve cavity 56 for allowing exhaust gas from the first and second volutes 42, 44 to bypass the turbine housing interior 40. Specifically, exhaust gas can flow from both of the first and second volutes 42, 44 through the valve cavity 56 to an environment outside of the turbine housing 24, bypassing the turbine housing interior 40, because the first valve member 64 is not disposed in the valve cavity 56. Accordingly, when the first valve member 64 is in the third position, pulses of exhaust gas from the first and second groups of cylinders 60, 62 flow through the first and second volutes 42, 44, respectively, and through the valve cavity 56 to an environment outside of the turbine housing 24, thereby bypassing the turbine housing interior 40.

With reference again to FIGS. 4 and 6, the valve assembly 54 also includes a valve shaft 72. As shown in FIG. 6, the valve shaft 72 is partially disposed in the valve interior 70. The valve shaft 72 is coupled to and extends from the first end 66 of the first valve member 64. The valve shaft 72 extends from the first end 66 of the first valve member 64 in a direction of second end 68 of the first valve member 64 to a free end 74 of the valve shaft 72 that is not disposed in the valve interior 70. In the illustrated embodiment, the valve shaft 72 is integral with the first end 66 of the first valve member 64. However, it is to be appreciated that the valve shaft 72 may not be integral with the first end 66 of the first valve member 64. Instead, the valve shaft 72 shaft may be coupled to the first end 66 of the first valve member 64 in any suitable manner, such as via fasteners, weldments, riveting, etc. Typically, the valve shaft 72 extends from the first end 66 of the first valve member 64 along the axis A and is movable along the axis A for moving the first valve member 64 between the first, second, and third positions. Although not required, typically the valve shaft 72 has a cylindrical configuration. However, it is to be appreciated that the valve shaft 72 may have any configuration suitable for moving the first valve member 64 between the first, second, and third positions, such as a rectangular prism configuration. The valve shaft 72 may be comprised of any suitable metal or plastic.

With reference again to FIG. 4, the valve assembly 54 further includes a second valve member 76. The second valve member 76 is engageable with the valve seat 52. With reference to FIG. 6, the second valve member 76 has a base 78 coupled to and disposed about the valve shaft 72. Although not required, typically the base 78 has a circular configuration, particularly when the valve seat 52 also has a circular configuration. However, it is to be appreciated that the base 78 may have any configuration suitable for engaging the valve seat 52. The second valve member 76 also has a projection 80 extending from the base 78 and about the valve shaft 72. The projection 80 extends from the base 78 into the valve interior 70 of the first valve member 64. In the illustrated embodiment, the projection 80 has a cylindrical configuration. However, it is to be appreciated that the projection 80 may have any suitable configuration. Although not required, typically the projection 80 is integral with the base 78. However, it is to be appreciated that the projection 80 may not be integral with the base 78 and instead the projection 80 may be coupled to the base 78 in any suitable manner. In the illustrated embodiment, the base 78 and the projection 80 collectively define a channel 82 that the valve shaft 72 extends through. The second valve member 76 may be comprised of any suitable metal or plastic. As shown in FIGS. 8-10, the second valve member 76 is movable between a closed position and an open position.

With reference to FIGS. 8 and 9, when the second valve member 76 is in the closed position, the base 78 is engaged with the valve seat 52 of the exterior surface 50 of the turbine housing 24 for restricting exhaust gas from the first and second volutes 42, 44 from bypassing the turbine housing interior 40. When the second valve member 76 is in the closed position, exhaust gas flows through the first and/or second volutes 42, 44 to the turbine housing interior 40 and is restricted from bypassing the turbine housing interior 40 because the base 78 of the second valve member 76 is engaged with the valve seat 52.

As shown in FIGS. 8 and 9, when the second valve member 76 is in the closed position, the valve shaft 72 is movable along the axis A relative to the second valve member 76 in order to move the first valve member 64 between the first and second positions. Moreover, the second end 68 of the first valve member 64 may abut the base 78 of the second valve member 76, as shown in FIG. 9, when the first valve member 64 is in the second position and the second valve member 76 is in the closed position.

With reference again to FIG. 8, when the second valve member 76 is in the closed position and the first valve member 64 is in the first position, pulses of exhaust gas from the first and second groups of cylinders 60, 62 flow through the first and second volutes 42, 44, respectively, to the turbine housing interior 40 and are restricted from flowing between the first and second volutes 42, 44 and from bypassing the turbine housing interior 40. Exhaust gas is restricted from flowing between the first and second volutes 42, 44, because the first valve member 64 is adjacent the wall 48, and exhaust gas is restricted from bypassing the turbine housing interior 40 because the base 78 of the second valve member 76 is engaged with the valve seat 52.

With reference to FIG. 9, when the second valve member 76 is in the closed position and first valve member 64 is in the second position, exhaust gas can flow between the first and second volutes 42, 44 because the first valve member 64 is spaced from the wall 48. However, exhaust gas is restricted from bypassing the turbine housing interior 40 because the base 78 of the second valve member 76 is engaged with the valve seat 52.

With reference to FIG. 10, when the second valve member 76 is in the open position, the base 78 is disengaged with the valve seat 52 of the exterior surface 50 of the turbine housing 24 for allowing exhaust gas from the first and second volutes 42, 44 to bypass the turbine housing interior 40. Because the base 78 of the second valve member 76 is disengaged from the valve seat 52, pulses of exhaust gas from the first and second groups of cylinders 60, 62 flow through the first and second volutes 42, 44, respectively, and through the valve cavity 56 to the environment outside of the turbine housing 24, thereby bypassing the turbine housing interior 40.

Typically, the first valve member 64 is in the third position when the second valve member 76 is in the closed position, as shown in FIG. 10. However, it is to be appreciated that the first valve member 64 may be in the first and/or second position when the second valve member 76 is in the open position. In such embodiments, portions of the pulses of exhaust gas from the first and second groups of cylinders 60, 62 bypass the turbine housing interior 40 whereas other portions of the pulses of exhaust gas flow through the first and/or second volutes 42, 44 to the turbine housing interior 40.

With reference again to FIG. 6, the valve assembly 54 may further include a biasing member 84. When present, the biasing member 84 is disposed in the valve interior 70 and about the valve shaft 72. The biasing member 84 is configured to bias the first valve member 64 into one of the first and second positions when the second valve member 76 is in the closed position. With reference to FIG. 9, in the illustrated embodiment, the biasing member 84 biases the first valve member 64 into the second position when the second valve member 76 is in the closed position. As such, a force must be applied to the valve shaft 72 strong enough to overcome a corresponding force of the biasing member 84 in order to move the valve shaft 72 so that the first valve member 64 is moved from the second position to the first position. Similarly, when the biasing member 84 biases the first valve member 64 into the first position when the second valve member 76 is in the closed position, a force must be applied to the valve shaft 72 strong enough to overcome a corresponding force of the biasing member 84 in order to move the valve shaft 72 so that the first valve member 64 is moved from the first position to the second position. The biasing member 84 may reduce noise, vibration, and harshness (NVH) characteristics associated with the valve assembly 54 during operation of the dual volute turbocharger 20.

Exposure of the biasing member 84 to exhaust gas increases wear of the biasing member 84, thereby reducing efficiency of the dual volute turbocharger 20. Specifically, exposure of the biasing member 84 to exhaust gas leads to relaxation and reduction in force capability, material degradation, oxidation, and/or corrosion of the biasing member 84 (i.e., wear of the biasing member). Moreover, exposure of the biasing member 84 to exhaust gas can ultimately lead to failure of the biasing member 84 due to the wear. Because the biasing member 84 is disposed in the valve interior 70, the biasing member 84 is shielded/protected from exhaust gas during operation of the dual volute turbocharger 20. In other words, exposure of the biasing member 84 to exhaust gas during operation of the dual volute turbocharger 20 is reduced as compared to other components of the valve assembly 54, such as the first and second valve members 64, 76. As such, wear of the biasing member 84 is also reduced, thereby increasing the efficiency of the dual volute turbocharger 20 and increasing lifetime of the dual volute turbocharger 20.

Typically, the biasing member 84 is chosen from a cupped spring, a curved spring, a wave spring, and a coil spring. In some embodiments, as shown in FIGS. 6-10, the biasing member 84 is a coil spring 84. However, it is to be appreciated that the biasing member 84 may be any biasing member 84 suitable for biasing the first valve member 64 into one of the first and second positions when the second valve member 76 is in the closed position.

With reference again to FIG. 6, in some embodiments, the biasing member 84 is disposed about the projection 80 of the second valve member 76. In such embodiments, the biasing member 84 is disposed about both the valve shaft 72 and the projection 80. However, it is to be appreciated that the biasing member 84 may be disposed about valve shaft 72 and not about the projection 80, as shown in FIG. 7.

With continued reference to FIG. 6, the second valve member 76 may further include a lip 86 extending radially from the projection 80 with respect to the axis A. Typically, the lip 86 is disposed in the valve interior 70 and is spaced from the base 78 of the second valve member 76, as shown in the illustrated embodiment. The configuration of the lip 86 is not particularly limited. For example, the lip 86 may have a circular configuration, a rectangular configuration, and the like. In the illustrated embodiment, the lip 86 is integral with the projection 80. However, it is to be appreciated that the lip 86 may not be integral with the projection 80 and instead may be coupled to the projection 80 in any suitable manner.

When the second valve member 76 includes the projection 80, the biasing member 84 is typically disposed between and in contact with the lip 86 of the second valve member 76 and the second end 68 of the first valve member 64, as shown in FIG. 6. In such embodiments, the second biasing member 84 is disposed about both the valve shaft 72 and the projection 80. Moreover, in such embodiments, the biasing member 84 typically biases the first valve member 64 into the second position when the second valve member 76 is in the closed position.

Figure 7:
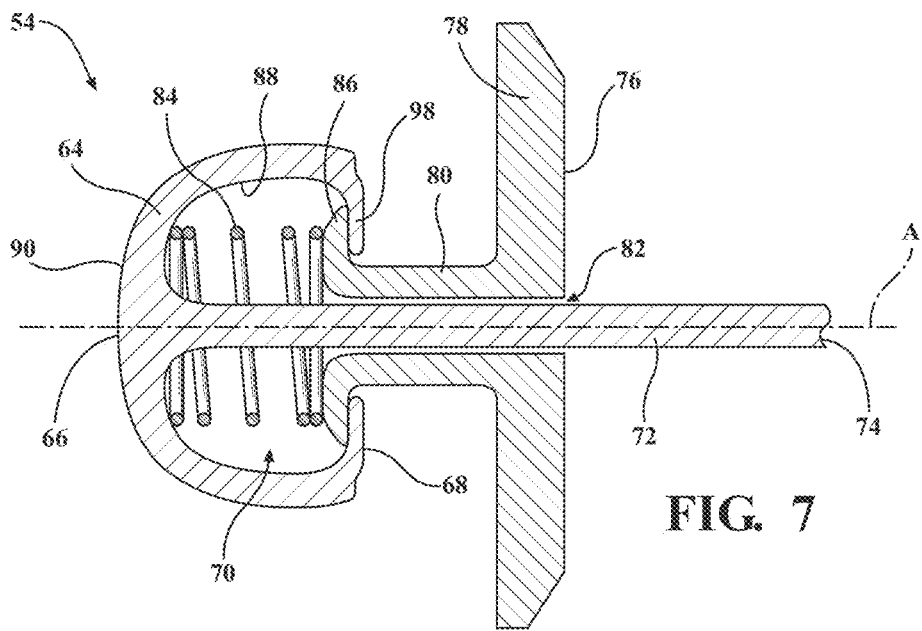
FIG. 7 is cross-sectional view of the valve assembly according to another embodiment.

In other embodiments, the biasing member 84 is disposed between and in contact with the lip 86 of the second valve member 76 and the first end 66 of the first valve member 64, as shown in FIG. 7. In such embodiments, the biasing member 84 is disposed about the valve shaft 72 but not the projection 80 of the second valve member 76. Furthermore, in such embodiments, the biasing member 84 typically biases the first valve member 64 into the first position when the second valve member 76 is in the closed position. Moreover, in such embodiments, the second end 68 of the first valve member 64 may abut the lip 86 of the second valve member 76 when the first valve member 64 is in the first position.

With reference again to FIG. 6, in some embodiments, the first valve member 64 has an inner contour 88 facing the valve interior 70 and an outer contour 90 facing away from the valve interior 70. In some embodiments, the outer contour 90 is configured to reduce wear of the valve assembly 54. Specifically, the outer contour 90 may reduce wear by reducing contact stress between the valve assembly 54 and the turbine housing 24.

During operation of the dual volute turbocharger 20, exhaust gas flows through the first and second volutes 42, 44 and exerts a force on the first valve member 64. Over time, force exerted by exhaust gas on the first valve member 64 causes wear of the first valve member 64, the valve shaft 72, and the second valve member 76. Specifically, force exerted by exhaust gas on the first valve member 64 causes the first valve member 64, the valve shaft 72, and the second valve member 76 to vibrate against each other and also causes the first and second valve members 64, 76 to vibrate against the turbine housing 24. These repeated vibrations cause wear of the first and second valve members 64, 76 and the valve shaft 72, thereby decreasing efficiency of the dual volute turbocharger 20 and ultimately leading to failure of the valve assembly 54. Wear of the first and second valve members 64, 76, and the valve shaft 72 also decreases efficiency of the dual volute turbocharger 20 because the wear results in a loss of control over the amount of exhaust bypassing the turbine housing interior 40 and also a loss of control over turbocharger boost levels. When the outer contour 90 is configured to reduce wear of the valve assembly 54, the outer contour 90 reduces force exerted by exhaust gas on the first valve member 64, thereby reducing wear of the first and second valve members 64, 76 and the valve shaft 72 because vibrations of the first and second valve members 64, 76 and the valve shaft 72 against each other and/or the turbine housing 24 are reduced. This reduced wear results in increased efficiency of the dual volute turbocharger 20, and increased lifetime of the dual volute turbocharger 20.

As shown in FIGS. 4-6, 11, and 12, in some embodiments, the outer contour 90 is cup-shaped for reducing wear of the valve assembly 54. However, it is to be appreciated that the outer contour 90 may have any suitable configuration for reducing wear of the valve assembly 54. Although not required, the outer contour 90 may abut the turbine housing 24 when the first valve member 64 is in the first and second positions, as shown in FIGS. 8 and 9.

Figure 11:
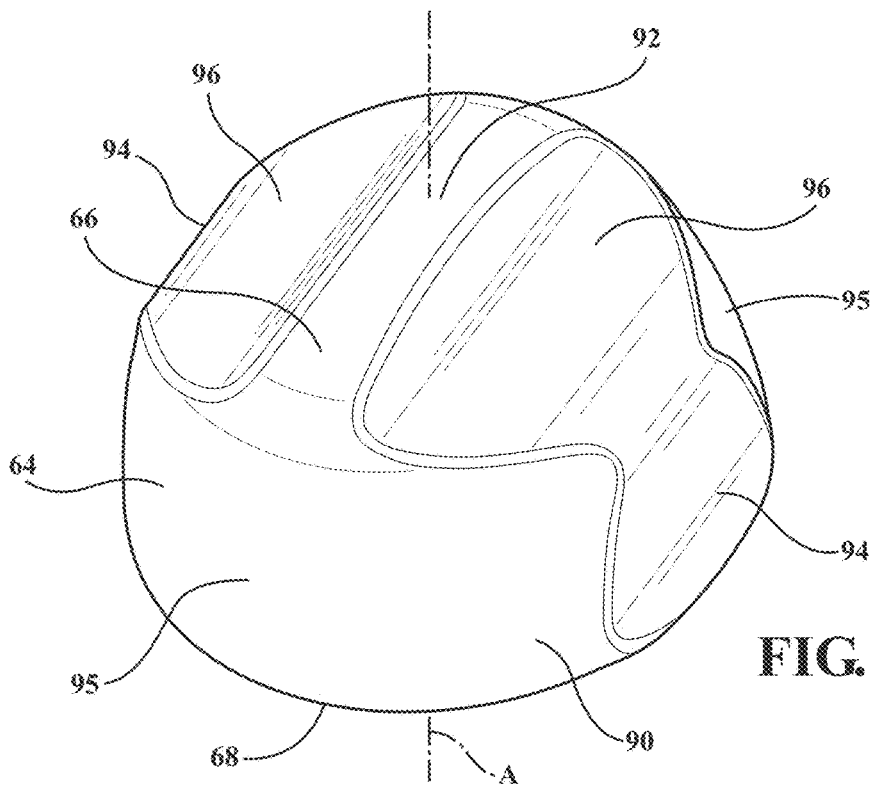
FIG. 11 is an isometric view of the first valve member of the valve assembly according to another embodiment, with the outer contour of the first valve member including a protrusion configured to engage the wall of the turbine housing.
Figure 12:
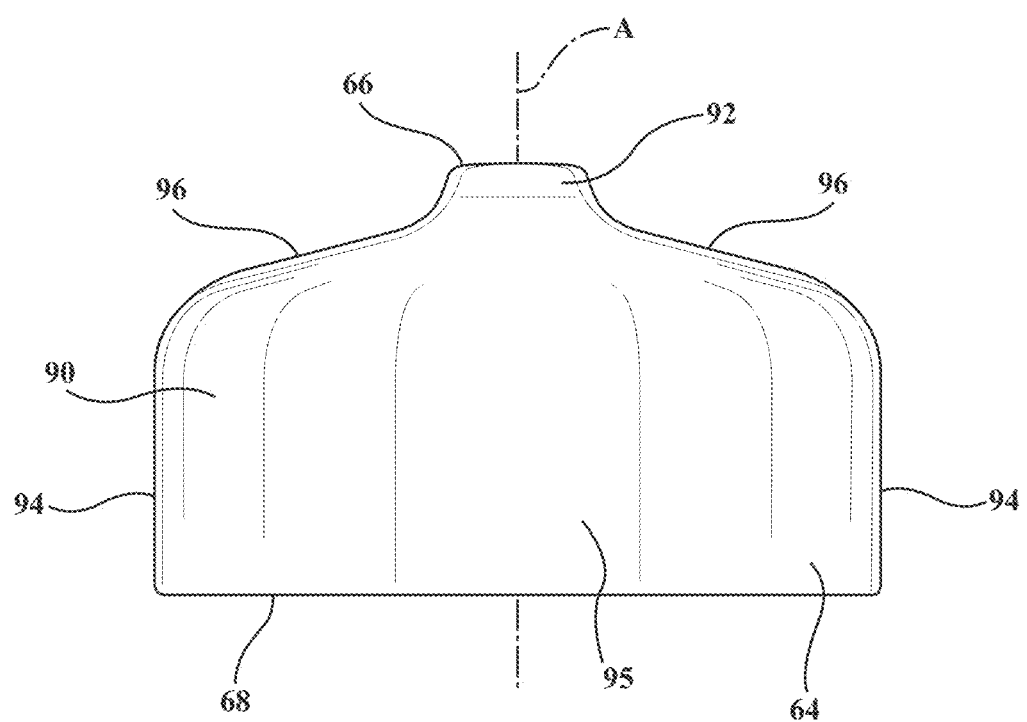
FIG. 12 is a side view of the first valve member of FIG. 11.

With reference to FIGS. 11 and 12, when the outer contour 90 is cup-shaped, the outer contour may include a protrusion 92. The protrusion 92 extends axially away from the valve shaft 72 and is configured to be engageable the wall 48 of the turbine housing 24 when the first valve member 64 is in the first position. When present, the protrusion 92 is located at the first end 66 of the first valve member 64. Typically, the protrusion 92 has a configuration that is complementary with the wall 48 of the turbine housing 24 for engaging the wall 48 such that the protrusion 92 prevents exhaust gas from flowing between the first and second volutes 42, 44 when the first valve member 64 is in the first position. In this manner, the outer contour 90 can be configured to reduce wear of the valve assembly 54 while also ensuring that exhaust gas does not flow between the first and second volutes 42, 44 when the first valve member 64 is in the first position.

Figure 5:
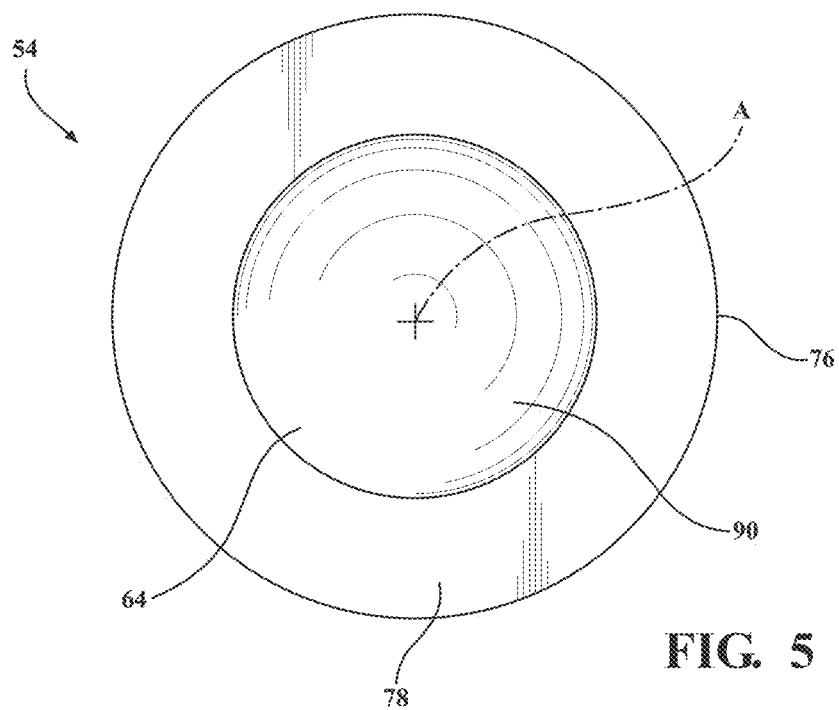
FIG. 5 is a front view of the valve assembly of FIG. 4, showing an outer contour of the first valve member that is rotationally symmetric about an axis.

In some embodiments, the outer contour 90 of the first valve member 64 is rotationally symmetric about the axis A, as shown in FIG. 5. When the outer contour 90 is rotationally symmetric about the axis A, typically the outer contour 90 is cup-shaped. However, it is to be appreciated that the outer contour 90 may be cup-shaped and not rotationally symmetric about the axis A, as shown in FIGS. 11 and 12. Moreover, it is to be appreciated that the outer contour 90 may be rotationally symmetric about the axis A and not cup-shaped.

With reference again to FIG. 12, the outer contour 90 may further include sidewalls 94. When present, the sidewalls 94 extend from the second end 68 of the first valve member 64 and along the axis A in the direction of the second end 66. Typically, the sidewalls are parallel, or substantially parallel, with the axis A. With reference to FIGS. 11 and 12, in the illustrated embodiment, the outer contour 90 includes two sidewalls 94. However, it is to be appreciated that the outer contour 90 may include any suitable number of sidewalls. For example, the outer contour 90 may include three, four, or even more sidewalls 94. The sidewalls 94 alter exhaust gas flow around the first valve member 64, particularly when the first valve member 64 is in the first and second positions, and may further reduce wear on the valve assembly 54 in addition to allowing a greater volume of exhaust gas to bypass the turbine housing interior 40 when the first valve member 64 is in the third position. When present, the sidewalls 94 are spaced circumferentially from each other with respect to the axis A. Typically, the sidewalls 94 are spaced equally and circumferentially from each other with respect to the axis A, as shown in FIG. 12. Alternatively, the sidewalls 94 may not be spaced equally and circumferentially from each other. Instead, the sidewalls 94 may be spaced circumferentially from each other at an angle of from about 140° to 180° with respect to the axis A. With reference to FIG. 11, in the illustrated embodiment, the sidewalls 94 are circumferentially spaced from each other at an angle of 180° with respect to the axis A.

With continued reference to FIG. 11, when the sidewalls 94 are present, the outer contour 90 typically includes first surface portions 95. Each of the first surface portions 95 extends about the axis A from one of the sidewalls 94 to an adjacent sidewall 94, as shown in FIG. 12. Typically, the first surface portions 95 have an arcuate configuration. Although not required, typically the number of first surface portions 95 included in the outer contour 90 is equal to the number sidewalls 94. When the protrusion 92 and two first surface portions 95 are present, the protrusion 92 may extend between the two surface portions 95, as shown in FIG. 11. The first surface portions 95 are spaced circumferentially from each other with respect to the axis A. Typically, the first surface portions 95 are spaced equally and circumferentially from each other with respect to the axis A.

The outer contour 90 may further include second surface portions 96, as shown in FIGS. 11 and 12. When present, the second surface portions 96 further reduce wear of the valve assembly 54 by altering exhaust gas flow around the first valve member 64, particularly when the first valve member 64 is in the first, second, and third positions. The second surface portions 96 may have an arcuate configuration. With reference to FIGS. 11 and 12, when the projection 92 and the sidewalls 94 are included in the outer contour 90 of the first valve member 64, each second surface portion 96 extends between one of the sidewalls 94 to the projection 92. In this manner, the outer contour 90 is further optimized for reducing wear of the valve assembly 54.

With reference again to FIG. 6, the second end 68 of the first valve member 64 may include a cover 98 extending about the axis A. When the second end 68 includes the cover 98, the cover 98 is disposed about the valve shaft 72. Moreover, when the cover 98 is present, the cover 98 and the inner contour 88 collectively define the valve interior 70. During operation of the dual volute turbocharger 20, the cover 98 further reduces exposure of the biasing member 84 to exhaust gas. The cover 98 may be integral with the valve member 64, as shown in FIG. 6. However, it is to be appreciated that the cover 98 may not be integral with the first valve member 64 and instead may be coupled to the first valve member 64 in any suitable manner.

With continued reference to FIG. 6, in the illustrated embodiment, the biasing member 84 is disposed between and in contact with the lip 86 of the second valve member 76 and the cover 98 of the first valve member 64. However, it is to be appreciated that the biasing member 84 is not necessarily in contact with the cover 98 when the cover 98 is present, as shown in FIG. 7.

The valve assembly 54 typically includes an actuator for moving the valve shaft 72 along the axis A to move the first valve member between the first, second, and third positions and the second valve member 76 between the closed and open positions. The actuator is operably coupled to the valve shaft 72. The actuator may be an electric actuator or a pneumatic actuator. The actuator is configured to move the first valve member 64 to the first position, the second position, the third position, and any other position between the first, second, and third positions. Moreover, the actuator is configured to move the second valve member 76 to the closed position, the open position, and any position between the closed and open positions.

The valve assembly 54 may be operably coupled to the dual volute turbocharger 20 in any suitable manner such that the valve assembly 54 is able to control exhaust gas flow from the first and second volutes 42, 44 to the turbine housing interior 40. For example, the valve assembly 54 may be operable coupled to the turbine housing 24, the compressor housing 32, and/or the bearing housing 34.

During operation of the internal combustion engine 22 and the dual volute turbocharger 20, the first valve member 64 is moved between the first, second, and third positions and the second valve member 76 between the open and closed positions based on operating conditions of the internal combustion engine 22 and the dual volute turbocharger 20. When the first valve member 64 is in the first position and the second valve member 76 is in the closed position (FIG. 8), as pulses of exhaust gas flow from the first and second groups of cylinders 60, 62 and through the first and second volutes 42, 44, respectively, the pulses of exhaust gas exert a back pressure on the internal combustion engine 22. When the back pressure on the internal combustion engine 22 meets or exceeds a particular threshold that is associated with deleteriously impacting the internal combustion engine 22, the first valve member 64 is be moved to the second position while the second valve member 76 remains in the closed position (FIG. 9). This reduces the back pressure on the internal combustion engine 22 to non-deleterious levels while also maintaining efficiency of the dual volute turbocharger 20 because the pulses of exhaust gas from each of the first and second groups of cylinders 60, 62 flow through both of the first and second volutes 42, 44, to the turbine housing interior 40, where the pulses of exhaust gas rotate the turbine wheel 26. It is to be appreciated that the first valve member 64 may be moved to the second position, or to a position between the first and second positions, in order to reduce back pressure on the internal combustion engine 22 while also maintaining efficiency of the dual volute turbocharger 20.

During operation of the internal combustion engine 22 and the dual volute turbocharger 20, the pulses of exhaust gas from each of the first and second groups of cylinders 60, 62 may exert a back pressure on the internal combustion engine 22 large enough that the back pressure cannot be reduced to non-deleterious levels by moving the first valve member 64 between the first and second positions while the second valve member 76 is in the closed position. In such instances, the second valve member 76 is moved from the closed position to the open position (FIG. 10). As described above, typically the first valve member 64 is in the third position when the second valve member 76 is in the open position. Moving the second valve member 76 into the open position allows exhaust gas from the first and second groups of cylinders 60, 62 to bypass the turbine housing interior 40 to an environment outside of the turbine housing 24, thereby ensuring the back pressure on the internal combustion engine 22 is reduced to non-deleterious levels. It is to be appreciated that the second valve member 76 may be moved to the open position, or to a position between the closed and open positions, in order ensure that the back pressure on the internal combustion engine 22 is reduced to non-deleterious levels.

One method of controlling the valve assembly 54 for the dual volute turbocharger 20 is described in U.S. Provisional Patent Application No. 62/806,396 titled "Method Of Controlling A Valve Of A Dual Volute Turbocharger" (having named inventors Michael Cola, Sascha Weiske, and Mehul Sonigra), which was filed on Feb. 15, 2019 and is hereby incorporated by reference in its entirety.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A dual volute turbocharger for receiving exhaust gas from an internal combustion engine and for delivering compressed air to the internal combustion engine, said dual volute turbocharger comprising:
    a turbine housing comprising,
        an interior surface defining,
            a turbine housing interior adapted to receive a turbine wheel,
            a first volute adapted for fluid communication with the internal combustion engine and said turbine housing interior for delivering exhaust gas from the internal combustion engine to said turbine housing interior,
            a second volute adapted for fluid communication with the internal combustion engine and said turbine housing interior for delivering exhaust gas from the internal combustion engine to said turbine housing interior, and
            a turbine housing outlet in fluid communication with said turbine housing interior for discharging exhaust gas from said turbine housing interior,
        a wall separating said first volute from said second volute, and
        a valve seat, wherein said wall and said valve seat collectively define a valve cavity; and
    a valve assembly for controlling exhaust gas flow from said first volute and said second volute to said turbine housing interior, said valve assembly comprising,
        a first valve member engageable with said wall of said turbine housing and disposed about and extending along an axis between a first end adapted to be proximal said wall of said turbine housing and a second end spaced from said first end and adapted to be distal said wall of said turbine housing, with said first valve member defining a valve interior between said first end and said second end, and with said first valve member movable between a first position where said first valve member is disposed in said valve cavity and adjacent said wall of said turbine housing for restricting exhaust gas from flowing between said first volute and said second volute, a second position where said first valve member is disposed in said valve cavity and spaced from said wall of said turbine housing for allowing exhaust gas to flow between said first volute and said second volute, and a third position where said first valve member is disposed outside of said valve cavity for allowing exhaust gas from said first volute and said second volute to bypass said turbine housing interior,
        a valve shaft partially disposed in said valve interior and coupled to and extending from said first end of said first valve member for moving said first valve member between said first position, said second position, and said third position,
        a second valve member engageable with said valve seat and having a base coupled to and disposed about said valve shaft and a projection extending from said base and about said valve shaft into said valve interior, with said second valve member movable between a closed position where said base is engaged with said valve seat of said turbine housing for restricting exhaust gas from said first volute and said second volute from bypassing said turbine housing interior, and an open position where said base is disengaged with said valve seat of said turbine housing for allowing exhaust gas from said first volute and said second volute to bypass said turbine housing interior, and
        a biasing member disposed in said valve interior and about said valve shaft, with said biasing member configured to bias said first valve member into one of said first position and said second position when said second valve member is in said closed position.

2. The dual volute turbocharger as set forth in claim 1, wherein said biasing member is chosen from a cupped spring, a curved spring, a wave spring, and a coil spring.

3. The dual volute turbocharger as set forth in claim 1, wherein said biasing member is configured to bias said first valve member into said second position when second valve member is in said closed position.

4. The dual volute turbocharger as set forth in claim 1, wherein said biasing member is disposed about said projection of said second valve member.

5. The dual volute turbocharger as set forth in claim 4, wherein said second valve member further comprises a lip extending radially from said projection with respect to said axis.

6. The dual volute turbocharger as set forth in claim 5, wherein said biasing member is disposed between and in contact with said lip of said second valve member and said second end of said first valve member.

7. The dual volute turbocharger as set forth in claim 6, wherein said biasing member is configured to bias said first valve member into said second position when said second valve member is in said closed position.

8. The dual volute turbocharger as set forth in claim 1, wherein said first valve member has an outer contour that is cup-shaped.

9. A valve assembly for controlling exhaust gas flow to a turbine housing interior of a dual volute turbocharger, said valve assembly comprising:
a first valve member disposed about and extending along an axis between a first end and a second end spaced from said first end, with said first valve member defining a valve interior between said first end and said second end, and with said first valve member movable between a first position, a second position, and a third position for controlling exhaust gas flow to the turbine housing interior of the dual volute turbocharger;
a valve shaft partially disposed in said valve interior and coupled to and extending from said first end of said first valve member, with said valve shaft extending along said axis from said first end of said first valve member for moving said first valve member between said first position, said second position, and said third position;
a second valve member having a base coupled to and disposed about said valve shaft and a projection extending from said base and about said valve shaft into said valve interior, with said second valve member movable between a closed position and an open position for controlling exhaust gas flow to the turbine housing interior of the dual volute turbocharger; and
a biasing member disposed in said valve interior and about said valve shaft, with said biasing member configured to bias said first valve member into one of said first position and second position when said second valve member is in said closed position;
wherein said biasing member is disposed about said projection of said second valve member, and
wherein said second valve member further comprises a lip extending radially from said projection with respect to said axis.

10. The valve assembly as set forth in claim 9, wherein said biasing member is chosen from a cupped spring, a curved spring, a wave spring, and a coil spring.

11. The valve assembly as set forth in claim 9, wherein said biasing member is disposed between and in contact with said lip of said second valve member and said second end of said first valve member.

12. The valve assembly as set forth in claim 9, wherein said first valve member has an outer contour that is cup-shaped.

13. A dual volute turbocharger for receiving exhaust gas from an internal combustion engine and for delivering compressed air to the internal combustion engine, said dual volute turbocharger comprising:
a turbine housing comprising,
an interior surface defining,
a turbine housing interior adapted to receive a turbine wheel,
a first volute adapted for fluid communication with the internal combustion engine and said turbine housing interior for delivering exhaust gas from the internal combustion engine to said turbine housing interior,
a second volute adapted for fluid communication with the internal combustion engine and said turbine housing interior for delivering exhaust gas from the internal combustion engine to said turbine housing interior, and
a turbine housing outlet in fluid communication with said turbine housing interior for discharging exhaust gas from said turbine housing interior,
a wall separating said first volute from said second volute, and
a valve seat, wherein said wall and said valve seat collectively define a valve cavity; and
a valve assembly for controlling exhaust gas flow from said first volute and said second volute to said turbine housing interior, said valve assembly comprising,
a first valve member engageable with said wall of said turbine housing and disposed about and extending along an axis between a first end adapted to be proximal said wall of said turbine housing and a second end spaced from said first end and adapted to be distal said wall of said turbine housing, with said first valve member defining a valve interior between said first end and said second end, and with said first valve member movable between a first position where said first valve member is disposed in said valve cavity and adjacent said wall of said turbine housing for restricting exhaust gas from flowing between said first volute and said second volute, a second position where said first valve member is disposed in said valve cavity and spaced from said wall of said turbine housing for allowing exhaust gas to flow between said first volute and said second volute, and a third position where said first valve member is disposed outside of said valve cavity for allowing exhaust gas from said first volute and said second volute to bypass said turbine housing interior,
a valve shaft partially disposed in said valve interior and coupled to and extending from said first end of said first valve member for moving said first valve member between said first position, said second position, and said third position, and
a second valve member engageable with said valve seat and having a base coupled to and disposed about said valve shaft and a projection extending from said base and about said valve shaft into said valve interior, with said second valve member movable between a closed position where said base is engaged with said valve seat of said turbine housing for restricting exhaust gas from said first volute and said second volute from bypassing said turbine housing interior, and an open position where said base is disengaged with said valve seat of said turbine housing for allowing exhaust gas from said first volute and said second volute to bypass said turbine housing interior;
wherein said first valve member has an outer contour configured to reduce wear of said valve assembly.

14. The dual volute turbocharger as set forth in claim 13, wherein said outer contour is cup-shaped for reducing wear of said valve assembly.

15. The dual volute turbocharger as set forth in claim 14, wherein said outer contour of said first valve member includes a protrusion configured to be engageable with said wall of said turbine housing when said first valve member is in said first position.

16. The dual volute turbocharger as set forth in claim 15, wherein said valve assembly further comprises a biasing member disposed in said valve interior and about valve shaft, with said biasing member configured to bias said first valve member into one of said first and second positions when said second valve member is in said closed position.

17. The dual volute turbocharger as set forth in claim 13, wherein said outer contour of said first valve member is rotationally symmetric about said axis.

18. The dual volute turbocharger as set forth in claim 17, wherein said valve assembly further comprises a biasing member disposed in said valve interior and about said valve shaft, with said biasing member configured to bias said first valve member into one of said first and second positions when said second valve member is in said closed position.

* * * * *